(12) United States Patent
Cameron

(10) Patent No.: US 7,509,750 B2
(45) Date of Patent: Mar. 31, 2009

(54) RECEPTACLE BOX INSTALLER AND METHOD

(75) Inventor: James Cameron, Ester, AK (US)

(73) Assignee: James T. Cameron, Ester, AK (US)

( * ) Notice: Subject to any disclaimer, the term of this patent is extended or adjusted under 35 U.S.C. 154(b) by 130 days.

(21) Appl. No.: 11/496,632

(22) Filed: Aug. 1, 2006

(65) Prior Publication Data

US 2008/0032567 A1  Feb. 7, 2008

(51) Int. Cl.
*G01B 1/00* (2006.01)

(52) U.S. Cl. ................ 33/528; 33/DIG. 10; D10/64

(58) Field of Classification Search ............ 33/528, 33/DIG. 10, 485–486, 613, 666; 269/8, 76; D10/64

See application file for complete search history.

(56) References Cited

U.S. PATENT DOCUMENTS

| | | | |
|---|---|---|---|
| 2,729,895 A * | 1/1956 | Backstrom | ............ 33/197 |
| 3,588,083 A | 6/1971 | Callahan | |
| 3,601,836 A | 8/1971 | Gunfaus et al. | |
| 3,875,669 A * | 4/1975 | Hull | ............ 33/528 |
| 3,954,717 A | 5/1976 | Tarr | |
| 4,181,295 A | 1/1980 | Duffy | |
| 4,404,751 A | 9/1983 | Rieckenberg | |
| 4,888,879 A | 12/1989 | Dixon | |
| 4,989,336 A * | 2/1991 | Waltrip et al. | ............ 33/526 |
| 5,157,844 A * | 10/1992 | Mallison et al. | ............ 33/528 |
| 5,348,274 A | 9/1994 | Breen | |
| 5,491,901 A | 2/1996 | Parrino | |
| 5,992,036 A | 11/1999 | Cannelli, Jr. | |
| 6,532,674 B2 * | 3/2003 | Farese | ............ 33/194 |
| 6,857,197 B2 | 2/2005 | Hicks | |
| 6,958,448 B2 | 10/2005 | Nave | |

OTHER PUBLICATIONS

International Search Report & Written Opinion for PCT/US07/14869, dated Jul. 23, 2008.

* cited by examiner

*Primary Examiner*—G. Bradley Bennett
*Assistant Examiner*—Tania C Courson

(57) ABSTRACT

A receptacle box installer includes an L-shaped element with a first arm and a second arm, a block attached to an inside surface of the first arm of the L-shaped element, and a gap between a side of the block closest to the second arm of the L-shaped element and the second arm of the L-shaped element. A user then inserts the second arm of the L-shaped element into a receptacle box until the gap is filled with an outside wall of the receptacle box. A surface of the block opposite the connection with the first arm of the L-shaped element is contacted with a front surface of a framing member. The receptacle box is then contacted with the framing member. A user then attaches the receptacle box to the framing member using standard attachment means. Once the receptacle box is installed on the framing member, the receptacle box installer is removed from the receptacle box.

21 Claims, 6 Drawing Sheets

RECEPTACLE BOX INSTALLER AND METHOD

BACKGROUND OF THE INVENTION a. Field of the Invention

The invention relates generally to types of devices for installation of receptacle boxes, and, more particularly, to devices and methods for accurately and consistently installing receptacle boxes in desired positions.

b. Description of Related Art

Receptacle or electrical boxes are commonly used in construction, remodeling and renovation of many types of building structures. Receptacle boxes maybe installed on beams, double studs, corners or other framing members. Receptacle boxes can be positioned at predetermined vertical and horizontal positions and then secured to framing members. Drywall or other wall coverings can then be installed surrounding the receptacle boxes.

To function properly, a receptacle box is preferably installed to fit flush with the wall coverings after installation of the wall coverings. To achieve this, the receptacle box should extend outward from a front edge of a framing member a distance equal to the thickness of a wall covering.

Systems exist for facilitating the measurement and installation of receptacle boxes. The most basic system utilizes a series of notches or lines on an outer surface of a receptacle box at common wall covering thicknesses. Other systems use more complicated means of temporarily securing a receptacle box to a framing member prior to final attachment. However, many existing systems and methods require complicated mechanisms or modified receptacle boxes that add substantially to labor or cost. Existing systems do not allow for use of a simple tool with capabilities for measuring checking correct installation of a receptacle box before installation of a wall covering. Existing systems only allow for use of predetermined set measurements.

Needs exist for improved devices for installation of receptacle boxes that are easy to use, inexpensive, operate with standard electrical boxes, and allow for rapid confirmation of correct installation.

SUMMARY OF THE INVENTION

The invention solves the problems and/or overcomes the drawbacks and disadvantages of the prior art by having a simple, easy to use configuration that allows immediate confirmation of correct installation.

In particular, the invention accomplishes this by providing a receptacle box installer. The receptacle box installer preferably includes an L-shaped element with a first arm and a second arm, a block extending from an inside surface of the first arm of the L-shaped element, and a recess between a side of the block closest to the second arm of the L-shaped element and the second arm of the L-shaped element adapted to receive a front edge of a side wall of a receptacle box.

To operate the receptacle box installer, a user may provide a receptacle box for attaching to an existing framing member. The user then may insert the second arm of the L-shaped element into the receptacle box until the recess is preferably filled with a wall of the receptacle box. A surface of the block facing away from an outside surface of the first arm of the L-shaped element maybe contacted with a front surface of a framing member. The receptacle box can then be contacted with the framing member. A user preferably attaches the receptacle box to the framing member using standard attachment means. Once the receptacle box is installed on the framing member, the receptacle box installer maybe removed from the receptacle box.

In a preferred embodiment, the receptacle box installation device preferably has an extension connected to a side surface of the block opposite the second arm of the L-shaped element and extending away from the second arm of the L-shaped element. The installation can be checked with the extension. The surface of the block facing away from an outside surface of the first arm of the L-shaped element may be rotated to face away from the front surface of the framing member. An outside surface of the first arm of the L-shaped element maybe contacted with the front surface of the framing member and abutted to the receptacle box. An offset of the receptacle box may be compared with a height of the block for ensuring proper installation. Installation is proper if the extension preferably slides over an edge of the receptacle box with close tolerance.

In another preferred embodiment, the first arm of the L-shaped element extends away from the second arm of the L-shaped element beyond a side surface of the block The installation can be checked with the extended first arm of the L-shaped element. The second arm of the L-shaped element can be rotated such that a top side of the second arm of the L-shaped element becomes a bottom side of the second arm of the L-shaped element. A side of the block opposite the connection to the first arm of the L-shaped element can be contacted with the front surface of the framing member and abutted to the receptacle box. An offset of the receptacle box can be compared with a height of the block for ensuring proper installation. Installation is proper if the first arm of the L-shaped element beyond the side surface of the block preferably slides over an edge of the receptacle box with close tolerance.

In another preferred embodiment, a receptacle box installation apparatus can include an element with a first arm and a second arm disposed at an angle to the first arm, a recess in the first arm proximate to the second arm for receiving a wall of a receptacle box, an angle portion defined in a distal end of the first arm The receptacle box installation apparatus maybe configured to receive the wall of the receptacle box in the recess. A portion of the first arm may be configured to contact the framing member, and the angle portion may be configured to receive the wall of the receptacle box after rotating the receptacle box installation apparatus. Preferably, the angle between the first arm and the second arm is ninety degrees.

In preferred embodiments, the block may be interchangeable with blocks of various heights. Alternatively, the receptacle box installation device maybe molded as one piece.

In preferred embodiments, the second arm of the L-shaped element may be sized to fit securely within the receptacle box against an inside wall closest to the framing member.

The invention may also include a means of checking the vertical position of the receptacle box along the framing member.

Additional features, advantages, and embodiments of the invention maybe set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE INVENTION

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

The present inventions are direct to an installation device and method for installation of receptacle devices on framing members. The invention allows for proper installation of a receptacle box at a predetermined depth such that the installed receptacle box is preferably flush with a wall covering after installation of the wall covering around the receptacle box.

Figure 1:
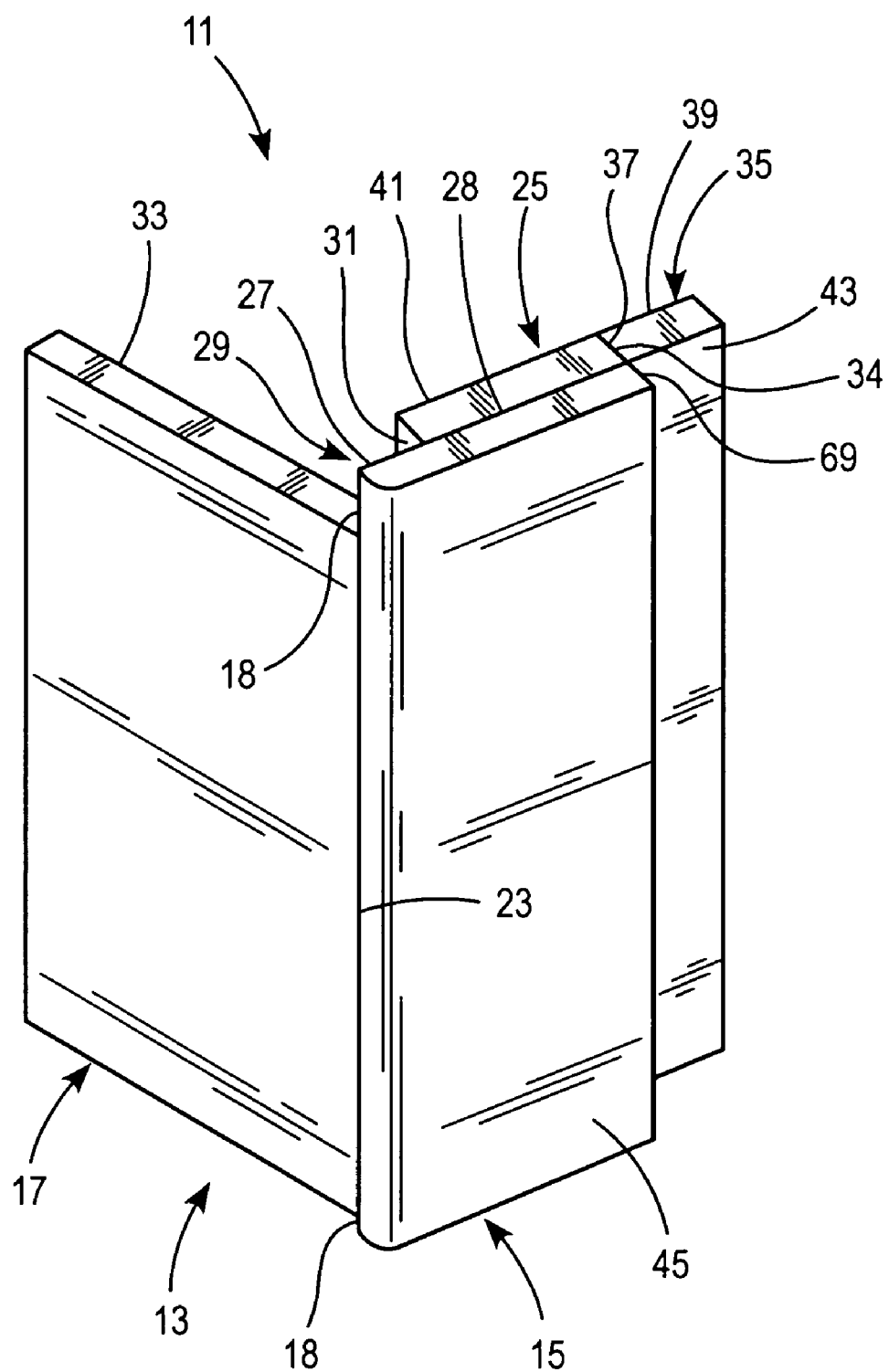
FIG. 1 is a perspective view of a receptacle box installation device with an extension on a block constructed according to the principles of the invention.
Figure 2:
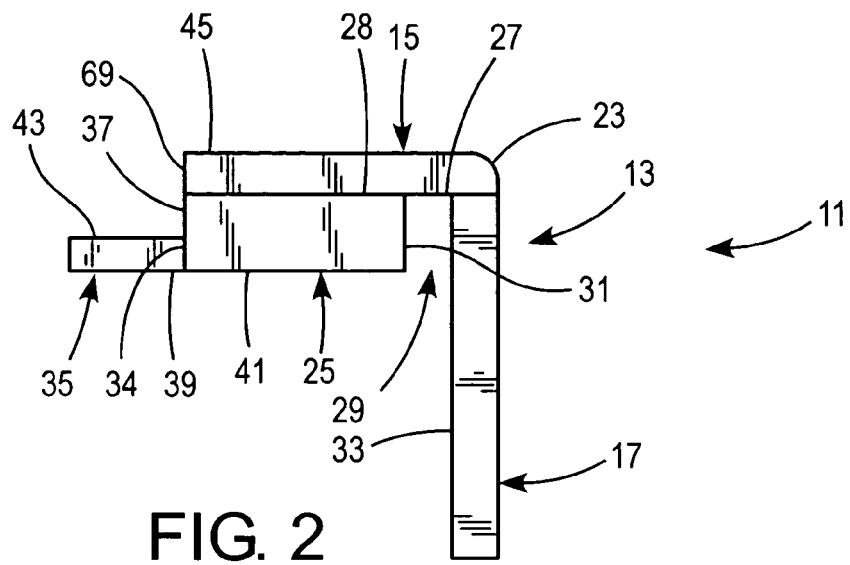
FIG. 2 is an end view of the receptacle box installation device of FIG. 1.
Figure 3:
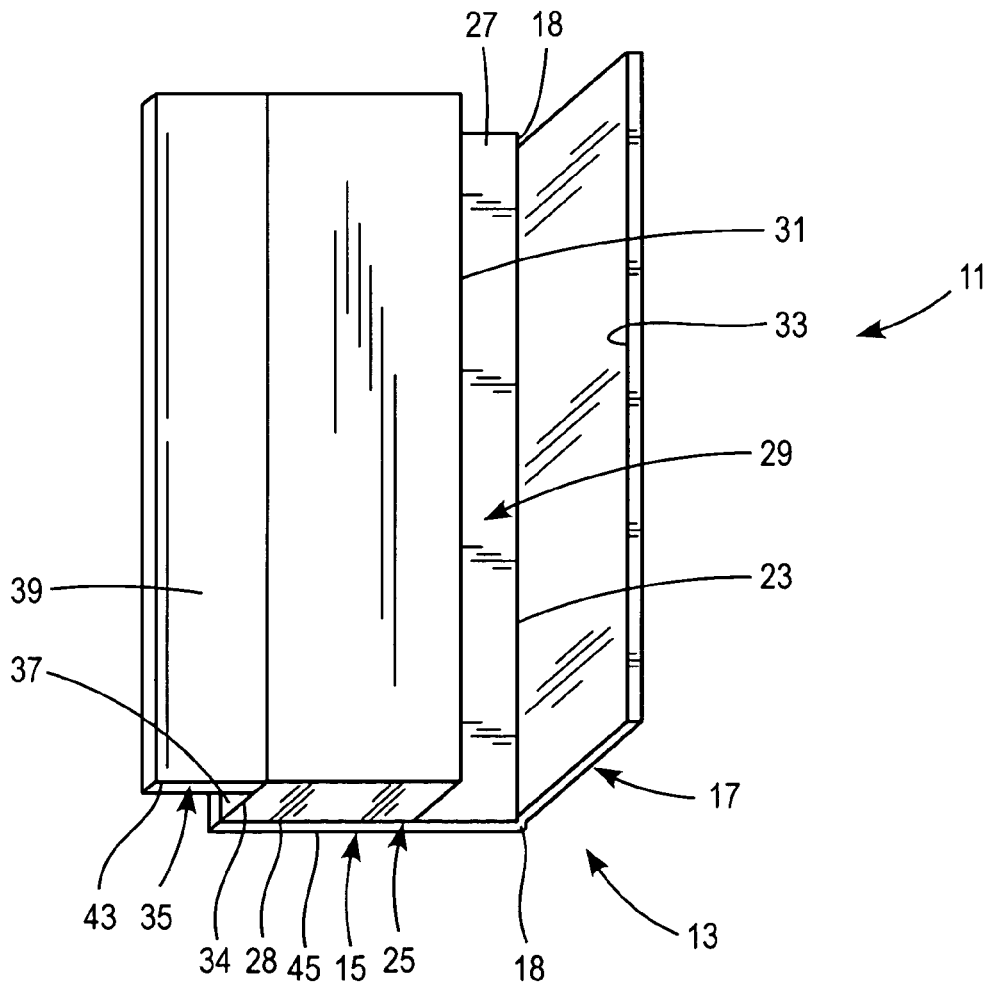
FIG. 3 is another perspective view of the receptacle box installation device of FIG. 1.

FIGS. 1-3 are several views of a first embodiment of an installation device 11. The installation device 11 can include a main L-shaped member 13. A first arm 15 of the L-shaped member 13 can be wider than a second arm 17 of the L-shaped member 13. The second arm 17 maybe sized to fit snuggly within an opening 19 of a standard receptacle box 21. Overhangs 18 can result from the different widths of the first arm 15 and second arm 17. The first arm 15 is preferably wide enough to not fit within the opening 19 of the receptacle box 21. This sizing should prevent incorrect use of the installation device 11.

The second arm 17 is preferably connected to the first arm 15 at a bend 23. The bend 23 may be an intersect between the separate first arm 15 and second arm 17 or the L-shaped member 13 may be formed of one continuous piece of material. The bend 23 is preferably a ninety degree angle, but may be other angles for specialized applications. The bend 23 is also preferably rounded, but may be squared or formed in another shape if necessary.

The first arm 15 is preferably connected to a block 25. The block 25 may be attached to an inner surface 27 of the first arm 15 at an outer surface 28 of the block 25. A gap 29 can be located between an inner side 31 of the block 25 and an inner surface 33 of the second arm 17.

A side surface 34 of an extension 35 may be connected to an outer side 37 of the block 25. An inner surface 39 of the extension 35 preferably lines up with an inner surface 41 of the block 25. The distance between an outer surface 43 of the extension and an outer surface 45 of the first arm 15 preferably corresponds to the thickness of a wall covering.

Figure 4:
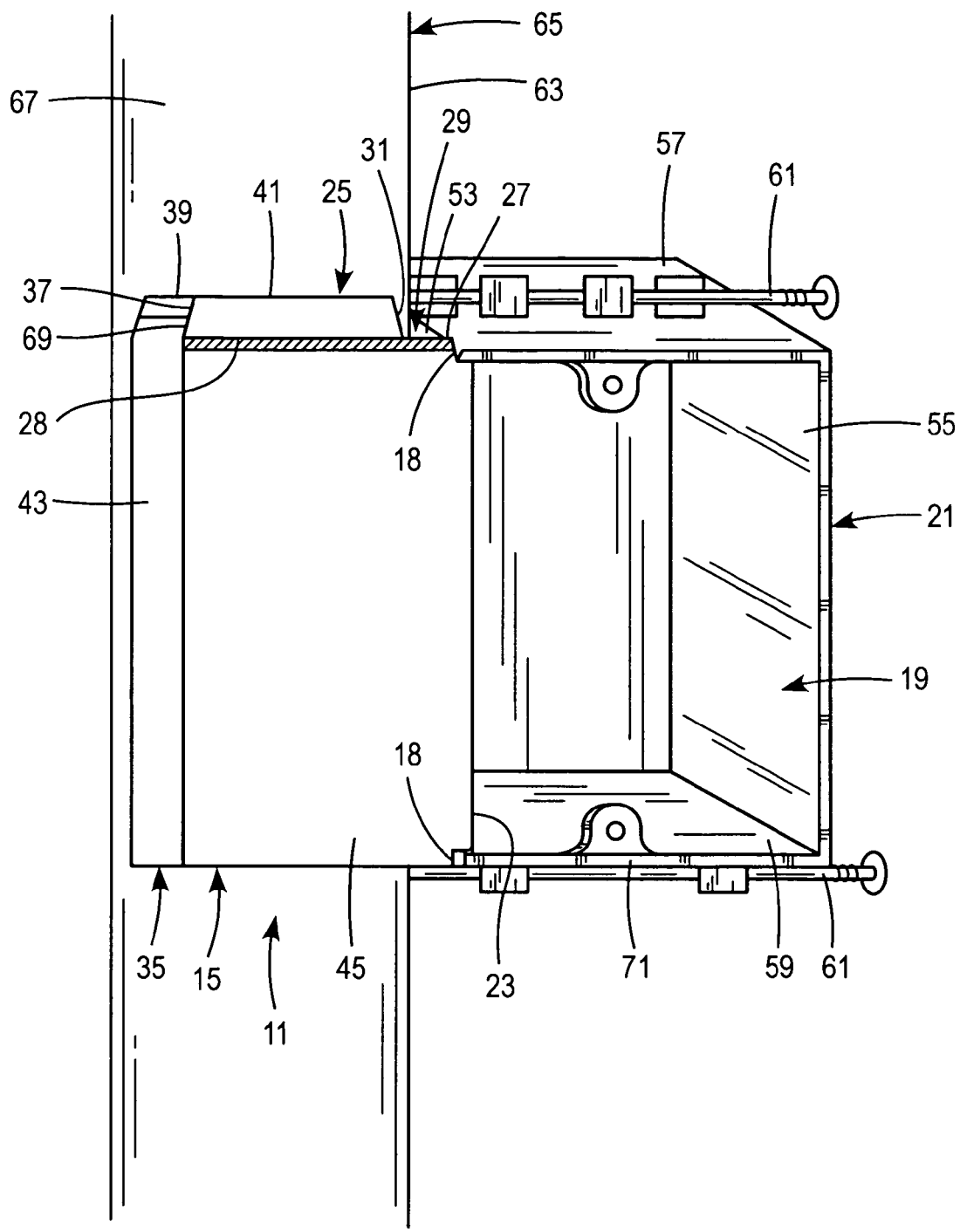
FIG. 4 is a perspective view of the receptacle box installation device of FIG. 1 coupled with a receptacle box.

FIG. 4 shows the installation device 11 connected to the receptacle box 21. The receptacle box 21 preferably has a first side wall 53, a second side wall 55, a top wall 57 and a bottom wall 59. In FIG. 4, the installation device 11 is mounted on the first side wall 53. However, a mirror image installation maybe performed by reversing the process. The installation device 11 maybe connected to a variety of surfaces in a variety of positions. The receptacle box 21 may also include standard installation hardware 61, such as nails, screws, etc.

To operate the installation device 11, the first side wall 53 of the receptacle box 21 is preferably placed against a side wall 63 of a framing member 65 at an appropriate vertical height. The receptacle box 21 is preferably a standard receptacle box 21, but other receptacle boxes maybe used. The second arm 17 of the installation device 11 can be placed within the opening 19 of the receptacle box 21 in close proximity to the first side wall 53. The inner surface 41 of the first arm 15 of the L-shaped member 13 can be abutted with a front surface 67 of the framing member 65. The receptacle box 21 is preferably maneuvered, while the installation device 11 is abutted to the framing member 65, such that the first side wall 53 fills the gap 29. When the receptacle box 21 is in the proper position, the installation hardware 61 maybe used to attach the receptacle box 21 to the framing member 65.

After attachment of the receptacle box 21 to the framing member 65, the installation device 11 maybe removed from the opening 19 of the receptacle box 21. Installation of the receptacle box 21 is completed properly without needing measurements or other specialized devices.

The present invention allows a user to check the accuracy of the installation before placing a wall covering over the receptacle box 21 and framing member 65. To check the installation, the installation device 11 may be rotated one hundred eighty degrees around a vertical axis. The outer surface 45 of the first arm 15 can be abutted to the front surface 67 of the framing member 65. An end 69 of the first arm 15 can be slid along the front surface 67 of the framing member 65 until contact is made with the first side wall 53 of the installed receptacle box 21. If installation was proper, the inner surface 43 of the extension 35 should pass over a front edge 71 of the receptacle box 21 with close tolerance.

If installation was proper, then no further action is needed regarding the receptacle box 21 before installation of a wall covering. If installation was not proper, the receptacle box 21 can be removed and the installation process repeated until installation is proper. The embodiments of the present invention prevent the need to remove an installed wall covering to reinstall a receptacle box 21.

The installation device 11 may be made in any size to fit available receptacle boxes 21. A preferred embodiment may include the following approximate dimensions: 4 cm length of first arm 15, 5 cm length of second arm 17, 9.5 cm width of first arm 15, 8.5 cm width of second arm 17, 9.5 cm width of extension 35, 0.5 cm depth of second arm 17, 3 cm length of block 25, 1.5 cm length of extension 35, 0.5 cm width of extension 35, and 0.5 cm width of gap 29. Other sizes and dimensions are possible.

Figure 5:
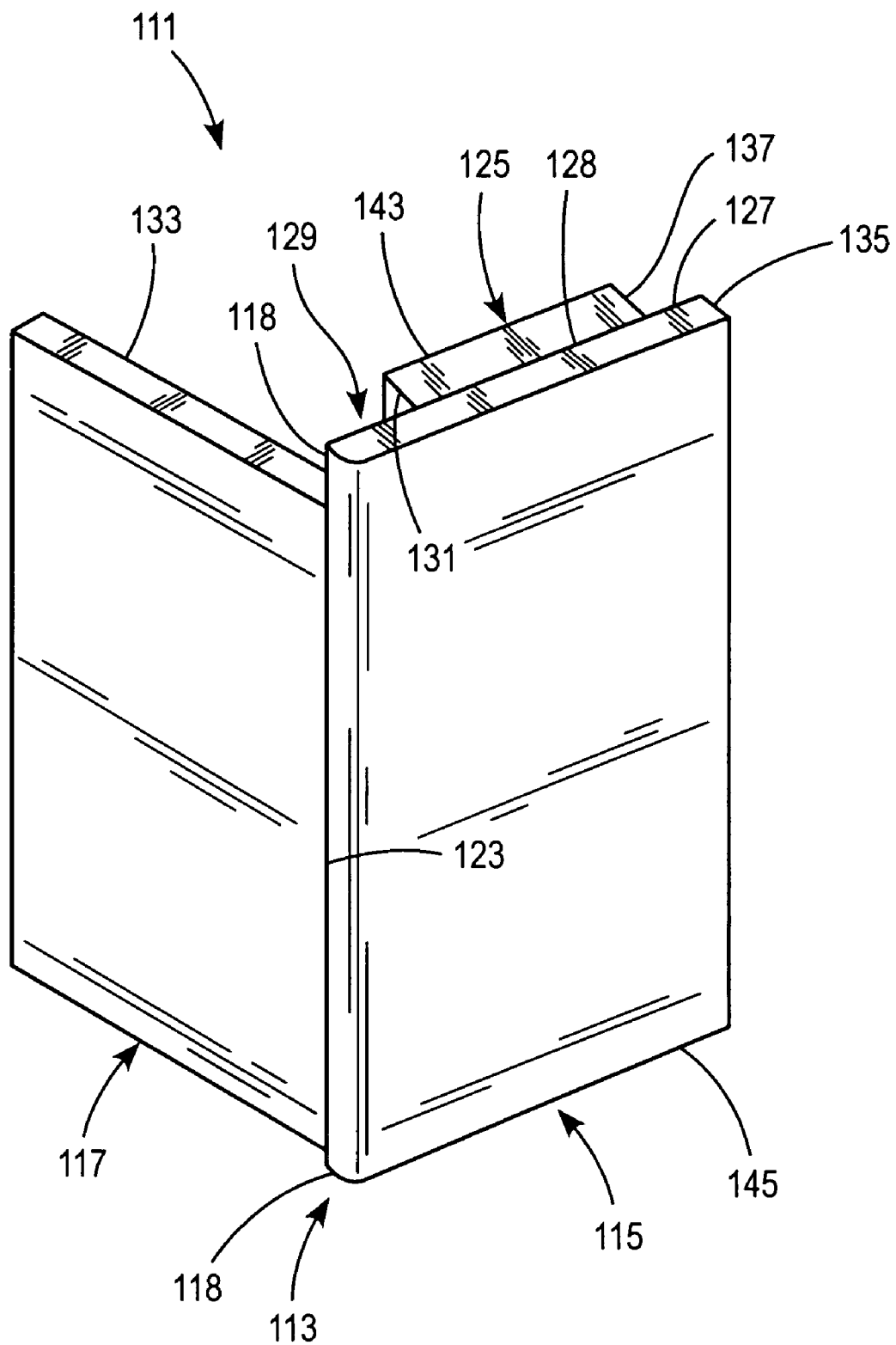
FIG. 5 is a perspective view of a receptacle box installation device with an extended L-shape on a block constructed according to the principles of the invention.
Figure 6:
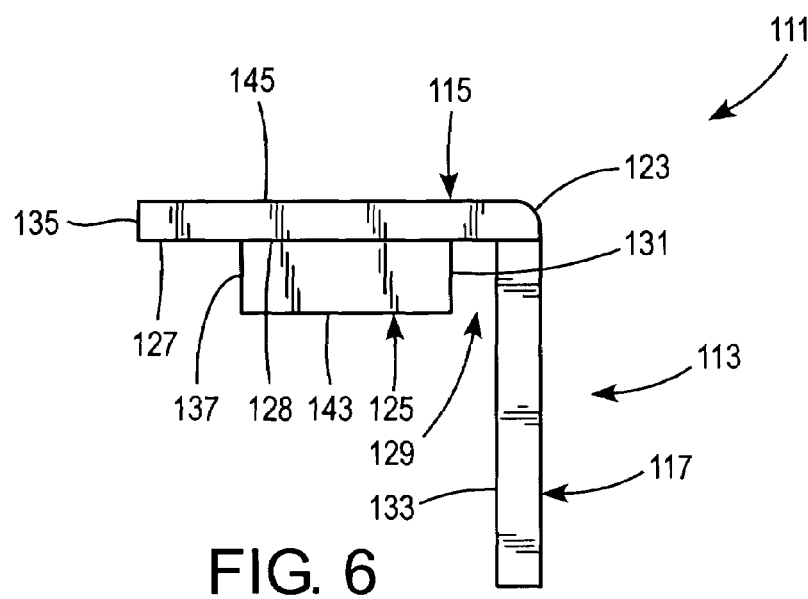
FIG. 6 is an end view of the receptacle box installation device of FIG. 5.
Figure 7:
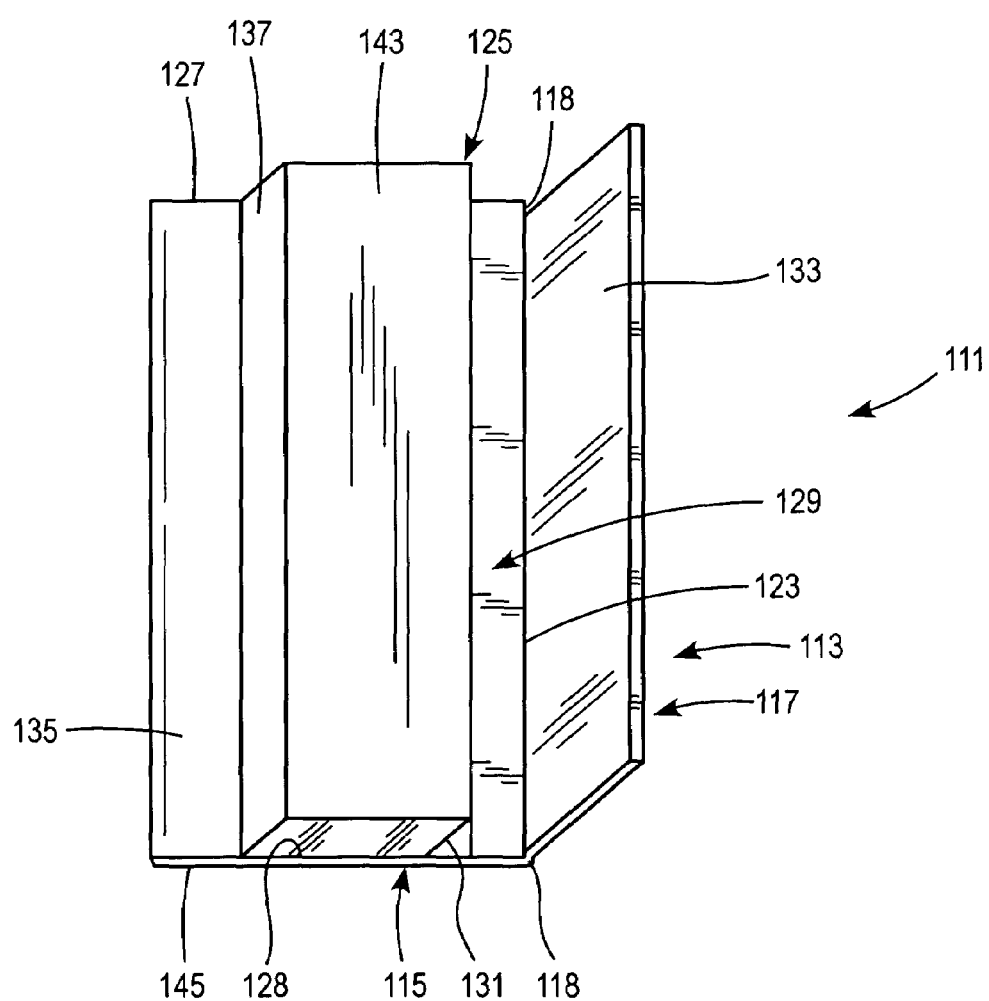
FIG. 7 is another perspective view of the receptacle box installation device of FIG. 5.

FIGS. 5-7 show another embodiment of an installation device 111. The installation device 111 preferably includes a main L-shaped member 113. A first arm 115 of the L-shaped member 113 is preferably wider than a second arm 117 of the L-shaped member 113. The second arm 117 can be sized to fit snuggly within an opening 19 of a standard receptacle box 21. Overhangs 118 can be the result of different widths of the first arm 115 and second arm 117. The first arm 115 is preferably wide enough to not fit within the opening 19 of the receptacle box 21. This sizing preferably prevents incorrect use of the installation device 111.

The second arm 117 is preferably connected to the first arm 115 at a bend 123. The bend 123 maybe an intersect between the separate first arm 115 and second arm 117 or the L-shaped member 113 maybe formed of one continuous piece of material with a bend 123. The bend 123 is preferably a ninety degree angle, but may be other angles for specialized applications. The bend 123 is also preferably rounded, but may be squared or formed in another shape if necessary.

The first arm 115 is preferably connected to a block 125. The block 125 can be attached to an inner surface 127 of the first arm 115 at an outer surface 128 of the block 125. A gap 129 can be located between an inner side 131 of the block 125 and an inner surface 133 of the second arm 117.

The first arm 115 preferably extends beyond an outside surface 137 of the block 125, forming a lip 135. The depth of the block 125 from the outer surface 128 to an inner surface 143 preferably corresponds to the thickness of a wall covering.

Figure 8:
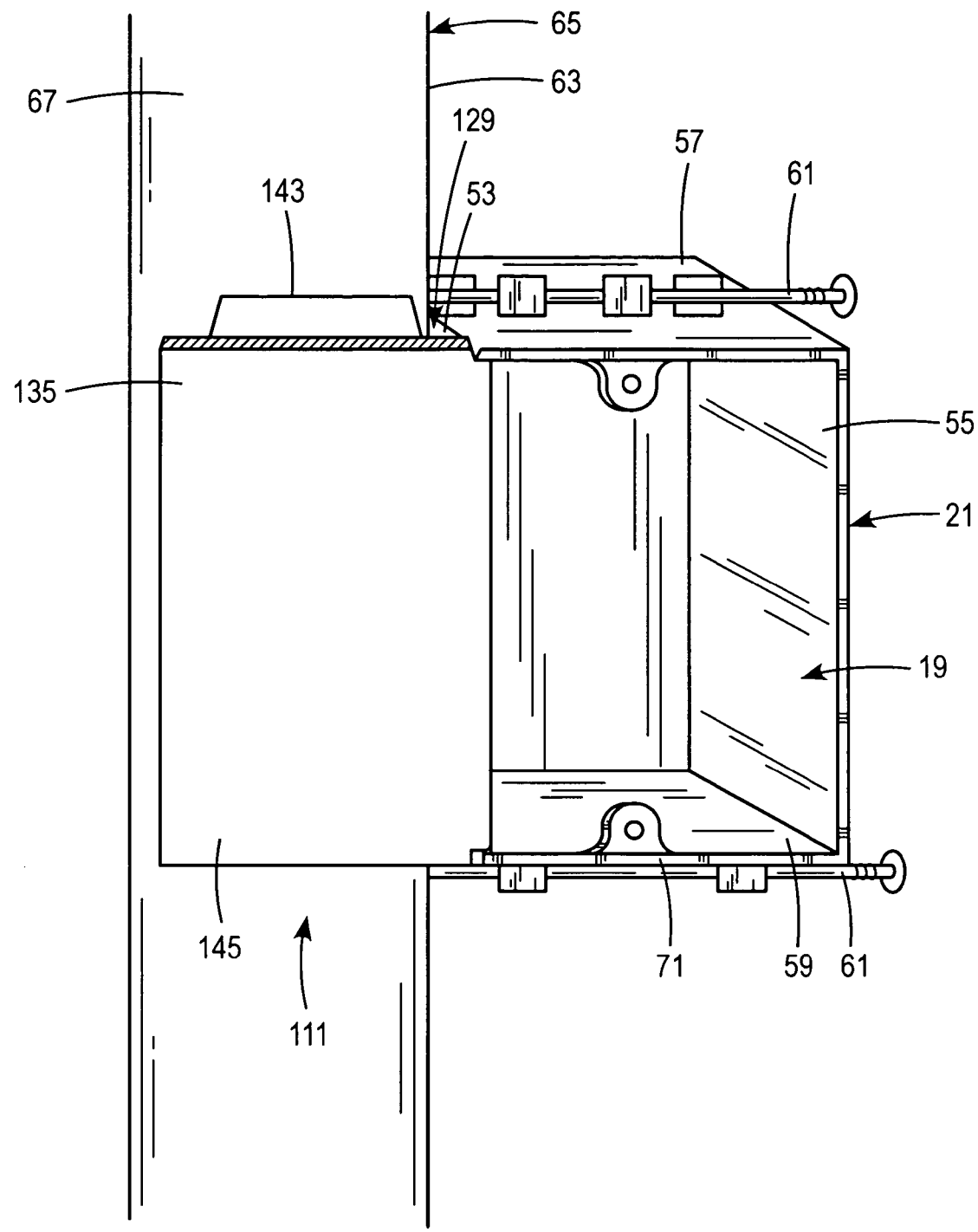
FIG. 8 is a perspective view of the receptacle box installation device of FIG. 5 coupled with a receptacle box.

FIG. 8 shows the installation device 111 connected to the receptacle box 21. The receptacle box 21 preferably has a first side wall 53, a second side wall 55, a top wall 57 and a bottom wall 59. In FIG. 8, the installation device 111 is mounted on the first side wall 53. However, a mirror image installation maybe performed by reversing the process. The installation device 111 maybe installed on any surface and in any orientation. The receptacle box 21 also preferably includes standard installation hardware 61, such as nails, screws, etc.

To operate the installation device 111, the first side wall 53 of the receptacle box 21 maybe placed against a side wall 63 of a framing member 65 at an appropriate vertical height. The receptacle box 21 is preferably a standard receptacle box 21, but other receptacle boxes maybe used. The second arm 117 of the installation device 111 can be placed within the opening 19 of the receptacle box 21 in close proximity to the first side wall 53. The inner surface 143 of the first arm 115 of the L-shaped member 113 maybe abutted with a front surface 67 of the framing member 65. The receptacle box 21 is preferably maneuvered, while the installation device 11 is abutted to the framing member 65, such that the first side wall 53 fills the gap 129. When the receptacle box 21 is in the proper position, the installation hardware 61 maybe used to attach the receptacle box 21 to the framing member 65. The receptacle box 21 is preferably held in place by a user's hand, but may also be held in place with a temporary securing means such as temporary adhesives or other methods.

After attachment of the receptacle box 21 to the framing member 65, the installation device 111 may be removed from the opening 19 of the receptacle box 21. Installation of the receptacle box 21 is preferably completed without measurements or other specialized devices.

The embodiments of the present invention allow a user to check the accuracy of the installation before placing a wall covering over the receptacle box 21 and framing member 65. To check the installation, the installation device 111 can be rotated one hundred eighty degrees around a vertical axis. An outer surface 145 of the first arm 115 can be abutted to the front surface 67 of the framing member 65. The outside surface 137 of the block 125 can be slid along the front surface 67 of the framing member 65 until contact is made with the first side wall 53 of the installed receptacle box 21. If installation was proper, the overhang 135 should pass over a front edge 71 of the receptacle box 21 with close tolerance.

If installation was proper, then no further action regarding the receptacle box 21 is needed before installation of a wall covering. If installation was not proper, the receptacle box 21 may be removed and the installation process repeated until installation is proper. The present invention preferably prevents the need to remove an installed wall covering to reinstall a receptacle box 21.

The installation device 111 maybe made in any size to fit available receptacle boxes 21. A preferred embodiment may include the following approximate dimensions: 5.5 cm length of first arm 115, 5 cm length of second arm 117, 9.5 cm width of first arm 115, 8.5 cm width of second arm 117, 9.5 cm width of block 125, 0.5 cm depth of first arm 115, 0.5 cm depth of second arm 117, 3 cm length of block 125, 2 cm length of overhang 135, 1 cm width of overhang 135, and 0.5 cm width of gap 129. Other sizes and dimensions are possible.

The installation device may be made from plastic, metal or any other suitable material. The installation device maybe molded from one piece of material. Different installation devices with blocks of different thicknesses maybe created for installing receptacle boxes with different thickness wall coverings. The different sized installation devices maybe sold individually or in sets.

Alternatively, the individual pieces maybe fabricated separately and combined to create the installation device. In additional embodiments, the blocks can be removable. Blocks of different sizes maybe used to create installation devices for installing receptacle boxes at various depths. If a thicker wall covering is used, then a thicker block preferably replaces the thinner block connected to the first arm. One L-shaped member may be used with a series of different sized blocks.

The installation device may also include a means for accurately measuring vertical height of the receptacle box above a floor or other horizontal surface. A measurement means may include a tape measure, laser distance measuring device, or any other suitable device.

The L-shaped member of the present invention can allow use of the installation device on beams, double studs or corners.

Furthermore, installation devices may be created and used with a wide variety of receptacle boxes other than standard receptacle boxes. For example, the installation devices may be sized and shaped to fit three way electrical boxes, circular receptacle boxes, or any other shapes and sizes.

The present invention may be in the form of other and various embodiments and configurations to accomplish the functions of properly installing a receptacle box and checking for installation accuracy.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention maybe used in conjunction with other embodiments, even if not explicitly stated above.

What is claimed is:

1. A receptacle box installer apparatus comprising:
an L-shaped element with a first arm and a second arm,
a block with a predetermined thickness extending from an inside surface of the first arm of the L-shaped element,
a recess between the second arm of the L-shaped element and a side of the block closest to the second arm of the L-shaped element that receives a front edge of a sidewall of a receptacle box,
an extension connected to a side surface of the block opposite the second arm of the L-shaped element and extending away from the second arm of the L-shaped element,
wherein the surface of the block facing away from an outside surface of the first arm of the L-shaped element is rotated to face away from a front surface of a framing member, wherein an outside surface of the first arm of the L-shaped element is contacted with the front surface of the framing member and abutted to the receptacle box, wherein an offset of the receptacle box is compared with a height of the block for ensuring proper installation, and wherein the extension is slid over an edge of the receptacle box with close tolerance for ensuring proper installation.

2. The apparatus of claim 1, wherein the second arm of the L-shaped element is inserted into the receptacle box, filling the recess with the side wall of the receptacle box.

3. The apparatus of claim 2, wherein a surface of the block facing away from an outside surface of the first arm of the L-shaped element contacts a front surface of a framing member.

4. The apparatus of claim 3, wherein the receptacle box installer apparatus contacts the framing member and the receptacle box during installation of the receptacle box.

5. The apparatus of claim 4, wherein the receptacle box installer apparatus is removed after attachment of the receptacle box to the framing member.

6. The apparatus of claim 1, wherein the block is interchangeable with blocks of various heights.

7. The apparatus of claim 1, wherein the receptacle box installer apparatus is molded as one piece.

8. The apparatus of claim 1, wherein the second arm of the L-shaped element fits securely within a receptacle box against an inside wall closest to a framing member.

9. The apparatus of claim 1, further comprising a means for checking the vertical position of the receptacle box along the framing member.

10. A kit comprising two or more apparatus as described in claim 1, wherein each apparatus as described in claim 1 is configured to install different types of receptacle boxes.

11. A receptacle box installation apparatus comprising:
an element with a first arm and a second arm disposed at an angle to the first arm,
an extension with a predetermined thickness extending from an inside surface of the first arm of the element,
a recess between the second arm of the element and a side of the extension closest to the second arm of the element receives a front edge of a sidewall of a receptacle box, and
a recess in a distal end of the first arm creating an angled space from the distal end of the first arm of the element to the inside surface of the first arm of the element,
wherein a portion of the first arm of the element extends away from the second arm of the element beyond a side surface of the extension, wherein the second arm of the element is rotated such that a top side of the second arm of the element becomes a bottom side of the second arm of the element, and wherein a side of the extension facing away from an outside surface of the first arm of the element is contacted with a front surface of a framing member and abutted to the receptacle box, wherein an offset of the receptacle box is compared with a height of the extension for ensuring proper installation, and wherein the portion of the first arm of the element beyond the side surface of the block is slid over an edge of the receptacle box with close tolerance for ensuring proper installation.

12. The apparatus of claim 11, wherein the angle between the first arm and the second arm is ninety degrees.

13. A method of installing a receptacle box comprising:
providing a framing member,
providing a receptacle box,
providing a receptacle box installation apparatus comprising an L-shaped element with a first arm and a second arm, a block with a predetermined thickness extending from an inside surface of the first arm of the L-shaped element, a recess between a side of the block closest to the second arm of the L-shaped element and the second arm of the L-shaped element,
inserting the second arm of the L-shaped element into the receptacle box until the recess is filled with an outside wall of the receptacle box,
contacting a surface of the block facing away from an outside surface of the first arm with a front surface of a framing member,
contacting a surface of a framing member,
attaching the receptacle box to the framing member,
rotating the receptacle box installation apparatus to determine if the attachment was acceptable, and
removing the receptacle box installation apparatus from the receptacle box.

14. The method of claim 13, wherein the receptacle box installation apparatus further comprises an extension connected to a side surface of the block opposite the second arm of the L-shaped element and extending away from the second arm of the L-shaped element.

15. The method of claim 14, further comprising rotating the surface of the block facing away from the outside surface of the first arm to face away from the front surface of the framing member, contacting an outside surface of the first arm of the L-shaped element with the front surface of the framing member, abutting the receptacle box installation apparatus to the receptacle box, and comparing an offset of the receptacle box with a height of the block for ensuring proper installation.

16. The method of claim 15, wherein the extension slides over an edge of the

17. The method of claim 13, wherein the first arm of the L-shaped element extends away from the second arm of the L-shaped element beyond a side surface of the block 18. The method of claim 17, further comprising rotating the second arm of the L-shaped element such that a top side of the second arm of the L-shaped element becomes a bottom side of the second arm of the L-shaped element, contacting a side of the block opposite the connection to the first arm of the L-shaped element with the front surface of the framing member, abutting the receptacle box installation apparatus to the receptacle box, and comparing an offset of the receptacle box with a height of the block for ensuring proper installation.

19. The method of claim 18, wherein the first arm of the L-shaped element beyond the side surface of the block slides over an edge of the receptacle box with close tolerance for ensuring proper installation.

20. The method of claim 13, further comprising checking the vertical position of the receptacle box along the framing member.

21. A kit comprising two or more apparatus as described in claim 13, wherein each apparatus as described in claim 13 is configured to install different types of receptacle boxes.

* * * * *